March 12, 1940.  C. E. BOYER  2,193,473
KNEE ACTION FOR AUTOMOBILES AND TRUCKS
Filed May 4, 1938
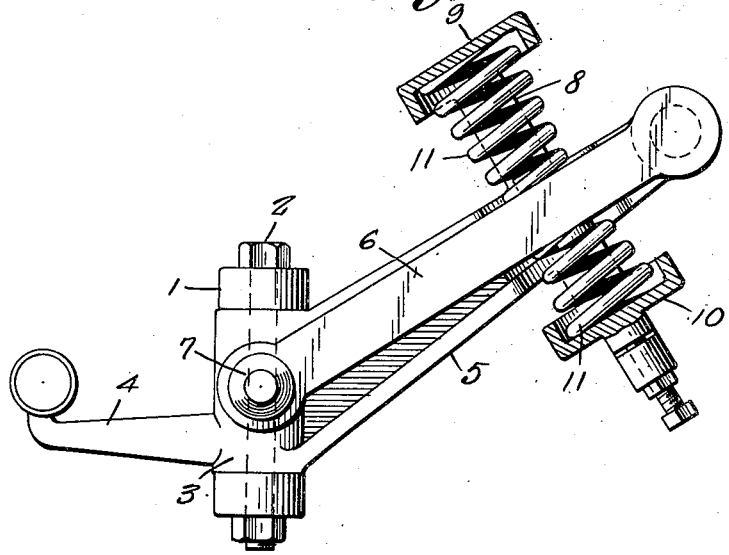
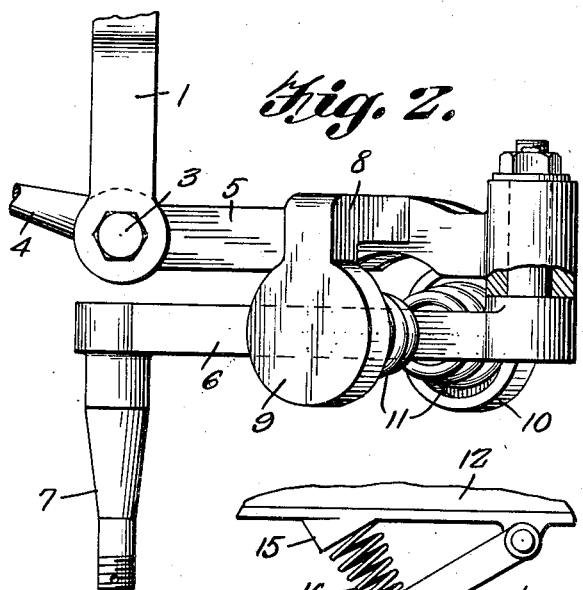
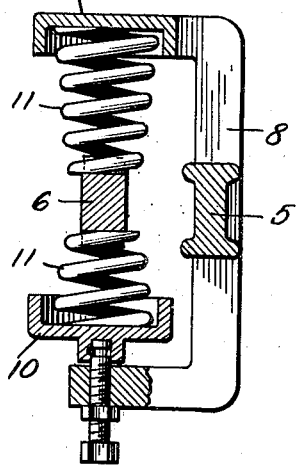
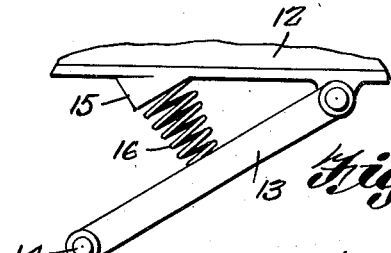
Clarence E. Boyer,
INVENTOR
BY Victor J. Evans & Co.
ATTORNEYS
WITNESS Patented Mar. 12, 1940

2,193,473

UNITED STATES PATENT OFFICE 2,193,473

KNEE ACTION FOR AUTOMOBILES AND TRUCKS

Clarence E. Boyer, Chicago, Ill.

Application May 4, 1938, Serial No. 206,058

4 Claims. (Cl. 267—20)

This invention relates to knee action for automobiles and other similar vehicles and has for the primary object the provision of a device of this character which will simulate more closely a natural knee action of a leg and will efficiently absorb road shocks and prevent said shocks from being delivered on to rigid construction or parts of the vehicle and will eliminate vehicle rebound caused by the shocks.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating knee action constructed in accordance with my invention.

Figure 2 is a fragmentary top plan view illustrating the same.

Figure 3 is a transverse sectional view illustrating the device.

Figure 4 is a fragmentary side elevation illustrating a modified form of my invention.

Referring in detail to the drawing, the numeral 1 indicates a fragmentary portion of a motor vehicle front axle, 2, the king bolt thereof. Journaled on the king bolt and located between the forked ends of the axle 1 is an axle sleeve 3 and integral with the latter is a steering arm 4. Integral with the sleeve and extending forwardly and upwardly relative to the axle 1 or the king bolt 2 is an arm 5 forming a part of the knee action forming the subject matter of the present invention. Journaled on the free end of the arm 5 is an arm 6 carrying at its free end an axle spindle 7 on which the front wheel of a vehicle is journaled. The arm 6 substantially parallels the arm 5 positioning the axle spindle 7 in substantially horizontal alignment with the axle 1.

A frame 8 is formed on the arm 5 adjacent the free end of the latter or adjacent to the journal connecting the arm 6 to the arm 5 and includes upper and lower spring seats 9 and 10. Coil springs 11 engage the seats and the arm 6. The springs are oppositely opposed and engage opposite sides or edges of the arm 6. The springs normally maintain the arm 6 in parallelism with the arm 5. The seat 10 is adjustably connected on the frame 8 whereby the tension of the springs may be varied. The contact of the springs with the arm 6 is closer to the journal end of said arm than to the free end of the arm to permit said arm to have a maximum swinging movement in an upward and downward direction on its journal.

In use, when the wheel journaled on the axle spindle 7 engages an obstruction it may move rearwardly and upwardly against the action of the uppermost spring which absorbs the shock of the wheel engaging the obstruction and prevents said shock from being transmitted to rigid parts of the motor vehicle. When the wheel passes into a depression in the road the wheel moves forwardly and downwardly against the action of the lowermost spring, the latter absorbing shock and preventing said shock from being transmitted to the vehicle. The wheel moving forwardly caused by the depression in the roadway has a tendency to bear upwardly on the arm 5, thereby aiding in maintaining the vehicle level.

The positioning of the double spring at right angular engagement with the arm 6 transmits the shock directly and evenly to the spring along its longitudinal axis, eliminating any torque or twisting, and by positioning one spring above the arm 6 and another spring below the arm 6, each will absorb the rebound or throw that usually accompanies the shock and which has heretofore been largely absorbed by the body or frame of the vehicle.

A knee action of the construction described closely simulates the human knee action of a leg and practically eliminates side sway in a vehicle quite common in other types of knee action.

Referring to the modified form of my invention as shown in Figure 4, shows the use thereof on a car or aeroplane or some other similar device wherein the frame of the device is indicated by the character 12 and has pivoted thereto an arm 13 which extends downwardly and rearwardly carrying at its free end an axle spindle 14 on which may be journaled a wheel. Formed on the frame 12 and extending forwardly and downwardly is a spring seat 15 and interposed between said seat and the arm 13 is a coil spring 16, the purpose of which is to cushion the upward movement of the arm 13 when the wheel passes over an obstruction.

What is claimed is:

1. A knee action comprising an arm journaled on an axle of a vehicle for movement about a vertical axis and extending forwardly and upwardly with respect to the axle, a second arm journaled on the free end of the first arm and extending rearwardly and downwardly therefrom and including an axle spindle on which a wheel may be journaled, and spring means carried by the first arm right angularly engaging opposite sides of the second arm substantially intermediate the engagement thereof with the first arm and the said axle spindle.

2. A knee action comprising an arm journaled on an axle of a vehicle for movement about a vertical axis and extending forwardly and upwardly with respect to the axle, a second arm journaled on the free end of the first arm and extending rearwardly and downwardly therefrom in spaced parallel relation therewith and including an axle spindle at its free end on which a wheel may be journaled, a frame carried by the first arm and disposed at right angles thereto intermediate the journal thereof with the second arm and the axle spindle, said frame extending above and below said second arm, and opposed springs carried by said frame and right angularly engaging and supporting the second arm.

3. A knee action comprising an arm journaled on an axle of a vehicle for movement about a vertical axis and extending forwardly and upwardly with respect to the axle, a second arm journaled on the free end of the first arm and extending rearwardly and downwardly therefrom in spaced parallel relation therewith and including an axle spindle on which a wheel may be journaled, a frame carried by the first arm intermediate the point of connection thereof with the second arm and the axle spindle, said frame extending above and below said second arm, opposed springs carried by said frame and right angularly engaging and supporting the second arm, said frame including spring seats, one of which is rigid with said frame and the other vertically adjustable relative thereto and said seats having the springs engaging therewith.

4. In a motor vehicle having an axle, the combination of an arm journaled on the axle for movement about a vertical axis and extending forwardly and upwardly with respect to the axle, a second arm pivoted at the free end to the first-mentioned arm and extending rearwardly and downwardly therefrom in spaced parallelism therewith and having an axle spindle formed on its free end on which a wheel may be journaled, a stationary spring seat carried by the first-mentioned arm intermediate the point of pivotal connection thereof with the second-mentioned arm and the said axle, said seat being positioned above the said second-mentioned arm, a vertically adjustable spring seat carried by the said first-mentioned arm and positioned below the said second-mentioned arm, said first and second-mentioned spring seats being aligned and normally disposed on a vertical axis relative to the said arms, and companion springs seated in the said spring seats and engaging the said second-mentioned arm at its upper and lower edges respectively in right angular engagement therewith, one of said springs being adapted to receive the main force of the shock and the other of the springs being adapted to receive the rebound or throw of the same.

CLARENCE E. BOYER.